March 17, 1970   R. R. SALMANS   3,500,881
APPARATUS USED IN PRODUCING CERAMIC CASTINGS
Filed July 10, 1968   3 Sheets-Sheet 1
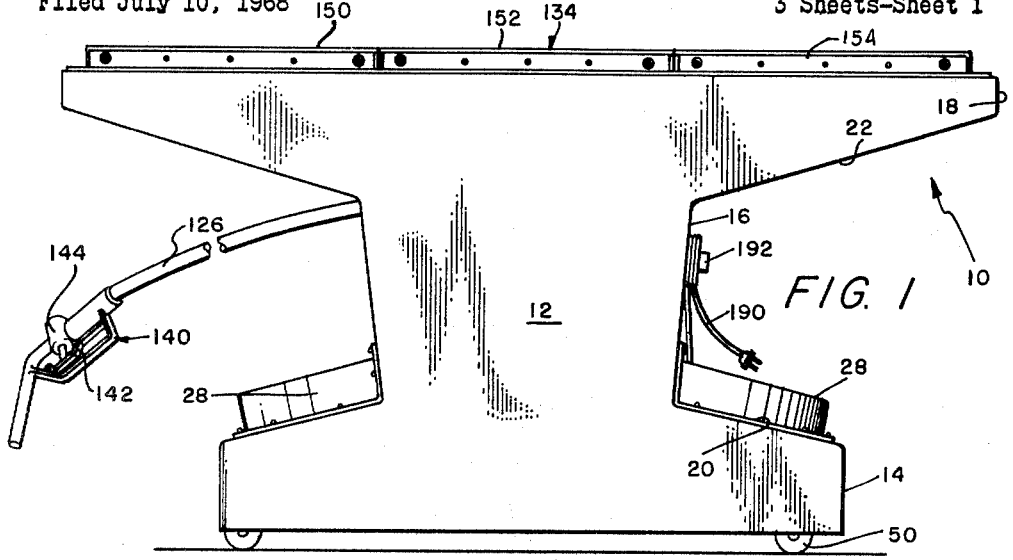
FIG. 1
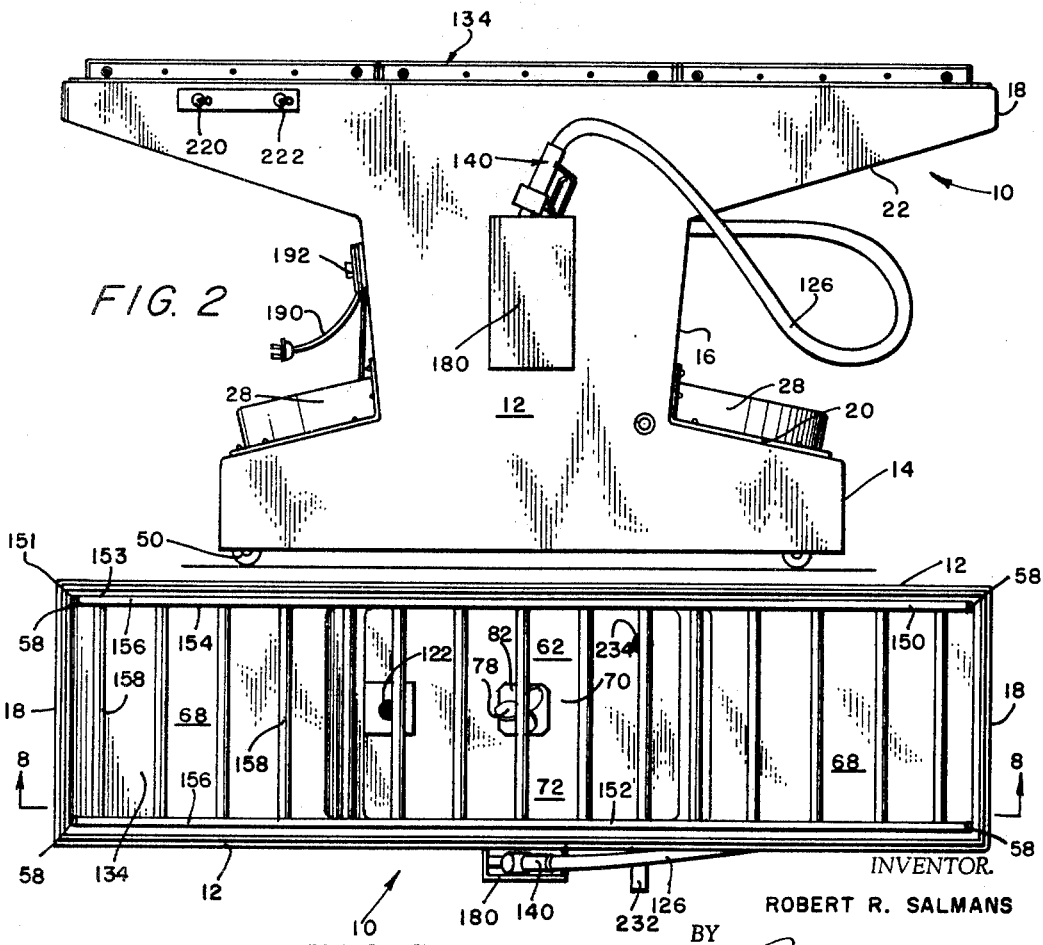
FIG. 2
FIG. 3
INVENTOR.
ROBERT R. SALMANS
BY
ATTORNEY

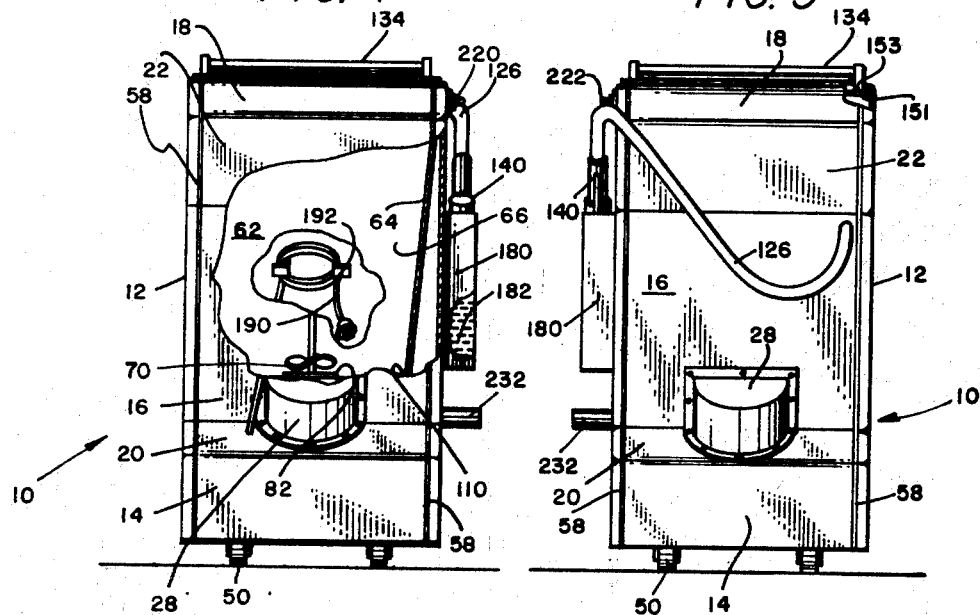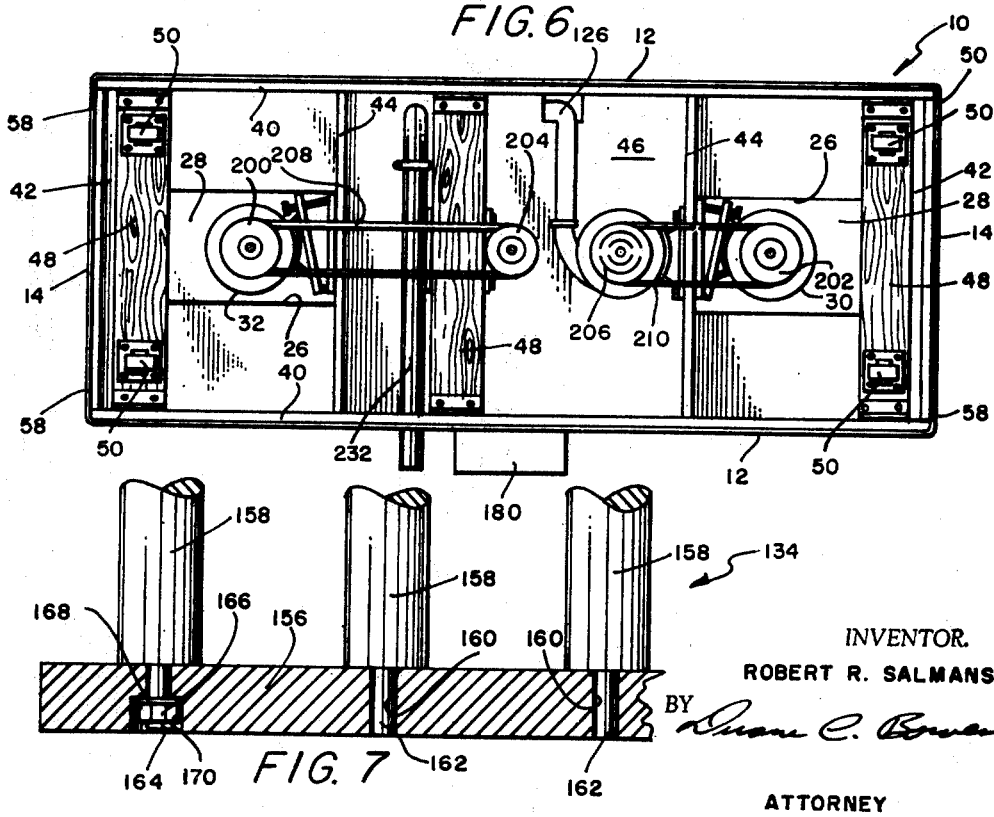

March 17, 1970 R. R. SALMANS 3,500,881
APPARATUS USED IN PRODUCING CERAMIC CASTINGS
Filed July 10, 1968 3 Sheets-Sheet 3
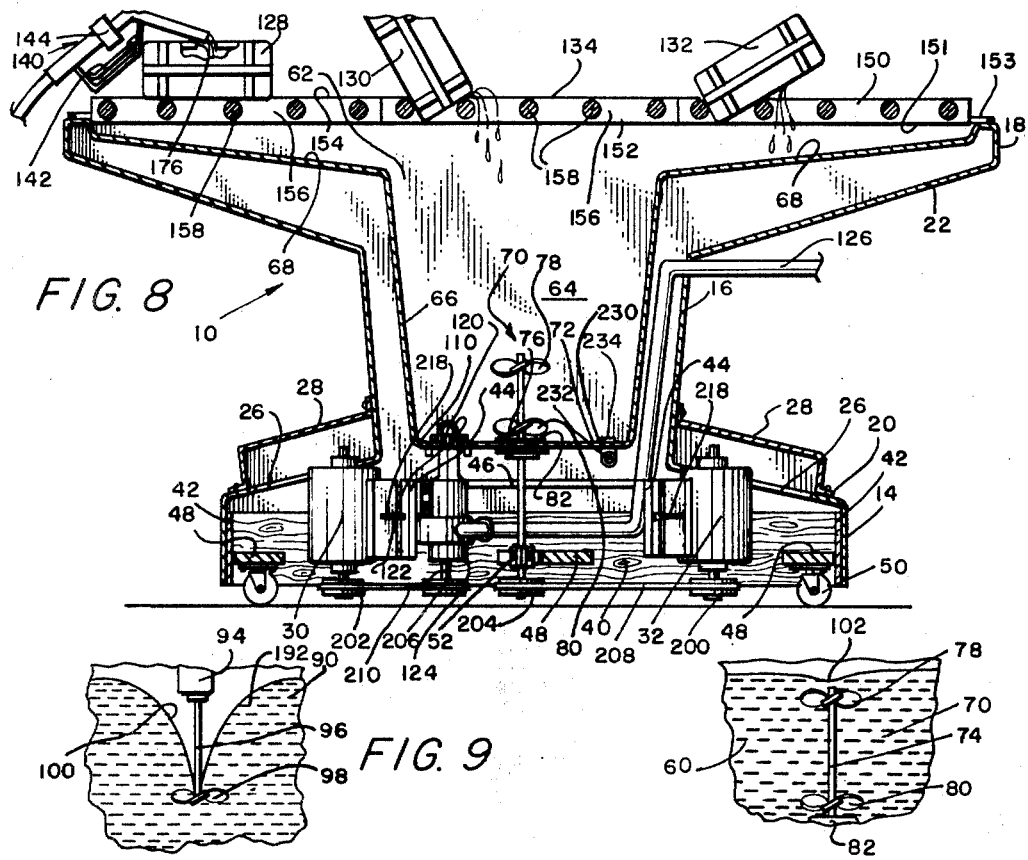
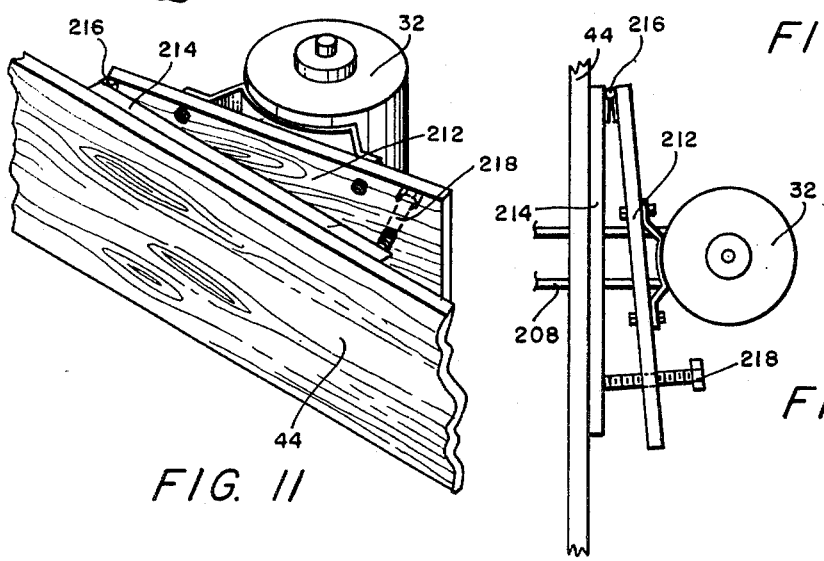
INVENTOR.
ROBERT R. SALMANS
BY
ATTORNEY

# United States Patent Office 3,500,881
Patented Mar. 17, 1970

3,500,881
APPARATUS USED IN PRODUCING CERAMIC CASTINGS
Robert R. Salmans, Wichita, Kans., assignor to Ceramics of Kansas, Inc., Wichita, Kans., a corporation of Kansas
Filed July 10, 1968, Ser. No. 743,823
Int. Cl. B65b 43/52, 67/02; B67d 5/02
U.S. Cl. 141—88         14 Claims

ABSTRACT OF THE DISCLOSURE

A horizontally elongated housing on wheels has a central, upwardly open chamber in which slip is mixed and stirred by a mixer upstanding from the bottom wall of the chamber. At each end of the top of the housing is a floor sloping to said chamber. Above the chamber and floors is a rack with roller type rails on which molds are positioned to be filled with slip by means of a hose connected to the bottom of said chamber and powered by a centrifugal pump. The configuration of the chamber and mixer feeds slip to the mixer in a manner avoiding air entrainment and avoiding deposits of unmixed or unstirred slip in the chamber.

---

For cross-reference purposes, it is identified that copending design patent application Ser. No. 11,891, was filed May 13, 1968, now Design Patent No. 213,997, issued Apr. 29, 1969.

BRIEF SUMMARY OF THE INVENTION

My invention relates to an improvement in apparatus in which slip is originally mixed and in which slip is also stirred to reduce viscosity before depositing in molds in the production of ceramic casting. Molds are supported on the apparatus and filled through a hose.

In production of ceramics by individuals and by smaller shops which are not of a size for automation and the like, for years slip was mixed (and stirred before mold pourings) in a wooden barrel as by a power mixer inserted from the open top of the barrel. A vortex cavity forms during operation of the mixer that can entrain air which can form cavities in poured castings. Unmixed or unstirred slip deposits can form in the lower corners of the barrel unless the mixer is tilted to try to reach corners. Commonly deposits to build up requiring periodic cleanings.

The barrel usually had a lower bunghole in which the usual type bunghole faucet is secured, and slip is drawn off into a paid and carried to some type of work surface (or the floor) on which the mold is supported during filling. After the mold has set a period of time, excess slip is poured off. As it is not uncommon for a mold to be heavy, i.e., 70#, and for the paid to slip to fill the same to have a comparable weight, the worker at best handles considerable weights and at worst handles weights with larger molds that may cause back injuries, hernias, etc., or, indeed, that are beyond the strength of some older people, women, etc. It will be observed that this situation can be called "primitive" relative to our generally advanced technology, is uneconomic, is unnecessarily fatiguing, and can cause worker injuries. Recently there has been some recognition that this is an unsatisfactory situation. My apparatus, shown and described herein, is believed to be the most advanced, sophisticated and satisfactory in operation of the apparatus that have been devised as improvements over "barrel and pail" operations.

The objectives of my invention include: to "mechanize" these operations with apparatus at a price suitable to individual or small shop usages; to provide an improved unitary slip mixing, slip stirring, mold pouring, and mold draining apparatus; to conserve slip and to avoid unmixed or unstirred slip deposits and to minimize air entrainment in slip; to avoid lifting slip or molds during mold pouring and during pouring off of excess slip from molds; and to provide apparatus of pleasing appearance, low maintenance, low cost and efficient operation.

Further objectives and advantages of my invention will be understood from the following description, read with reference to the drawings, in which:

FIGURE 1 is a side view of apparatus used in producing ceramic castings and illustrating a specific embodiment of my invention.
FIGURE 2 is a view of the opposite side.
FIGURE 3 is a top view.
FIGURE 4 is an end view with certain portions broken away to reveal interior construction.
FIGURE 5 is a view of the opposite end.
FIGURE 6 is a bottom view.
FIGURE 7 is an enlarged fragmentary top view, partly in section, of portions of the rack.
FIGURE 8 is a side view like FIGURE 2 only shown mostly in section.
FIGURE 9 is a fragmentary view illustrating the vortex cavity that is formed in the slip when a mixer is inserted from above.
FIGURE 10 is like FIGURE 9 only illustrating the avoidance of a substantial vortex cavity when the mixer shaft is upstanding from the chamber bottom.
FIGURE 11 is a partial enlarged perspective view taken from above and to one side of the motor mounting assembly.
FIGURE 12 is a top view of the structure seen in FIGURE 11.

The apparatus has a horizontally elongated housing 10. Side walls 12 are upright and in side view a generally T-shaped outline is presented with a wider base portion, a narrower intermediate portion and a widest top portion whereby the end walls have base portions 14, intermediate portions 16, top portions 18, sloping walls 20 connecting base portions 14 and intermediate portions 16, and sloping walls 22 connecting intermediate portions 16 and top portions 18. Walls 20 have access openings 26 and removable covers 28 are secured as by screws to cover openings 26. Motors 30, 32 protrude upwardly partly through openings 26.

The exterior walls and the upwardly open interior walls are preferably formed from a fiberglass reinforced plastic. Contours are formed by laying-up on a mold and pulling a vacuum for final shaping. A polyester resin is suitable. Of course it would be possible to form these walls from various plastics, wood or metal. Wood needs a resin or other release coating to avoid slip sticking to the same and to prevent absorption of water from the slip. Iron should be avoided because of chemical reaction with slip. The desirable characteristics are minimum adherence of slip to the wall material and avoidance of absorption of water (which are partly related factors), and release coatings should be used to the extent the wall material is deficient in these respects. Obviously this is primarily needed in the interior walls, but it is also desirable for the exterior walls as slip may inadvertently spill on these in production conditions and minimum clean-up is understandably desirable. The general appearance of housing 10 is aesthetically pleasing and it will be understood that the plastic can be of a selected, desirable color. Appearance is important in sales of apparatus and in shop appearance to customers. Employees will have better morale and do better work with good looking facilities.

The plastic parts are secured to a wood undercarriage by fasteners or by bonding. The wood frame is partly detiled in the drawings, although this construction will be readily understood to those working in the art and can be variously modified. The wood parts illustrated include side members 40, end members 42, intermediate transverse members 44, central top box sheet 46, and two inch thick transverse members 48 to which the four corner caster wheels 50 are secured and to which a mixer shaft bearing 52 is secured. The plastic walls can be divided and joined in any suitable way but in the structure shown side walls 52 are separated and joined on lines or plane 58, which are best shown in FIGURES 4 and 5, by suitable securing and/or sealing means.

To turn now to the upwardly open cavity and interior walls and parts therein, slip 60 is mixed and contained in an upwardly open chamber 62 which has upwardly flaring side and end walls 64, 66. End walls 66 lead to sloping floors 68 which for purpose of definiteness are defined to slope no more than 45° to the horizontal to indicate their purpose is primarily for increasing rack space and to have enough slope to drain any slip falling thereon into chamber 62. The chamber shown may be taken as having 30 gallon capacity. By increasing dimensions somewhat, a 50 gallon capacity may be provided, i.e., making the chamber a few inches longer and wider.

Slip is originally mixed in chamber 62, may be stored therein for any suitable period of time, and is stirred or agitated in the chamber to decrease viscosity before filling molds. Without trying to be precise in the chemistry involved, it is well known that slip has thixotropic type characteristics, or the like, meaning that it is less liquid or more viscous when allowed to stand for a while and meaning that the slip becomes more liquid or less viscous when then stirred. The slip too viscous when allowed to set for ready use in pouring molds; which is why some type of agitation is used to reliquefy. Whether in the settled condition, the slip is jelled and the exact chemical mechanism involved are not important to this discussion.

Mixer 70 is upstanding from the central portion of chamber bottom wall 72 and includes a shaft 74, a second bearing 76 for the shaft, preferably both upper and lower blades 78, 80, for thorough mixing and a bottom plate 82. Bottom wall 72 is secured between plate 82 and bearing 76 which include suitable shaft sealing means.

As above related, problems with mixing and with later stirring or agitating to reduce viscosity before mold pouring include (a) air entrainment which can cause cavities in castings, and (b) deposit of unmixed or unagitated slip which is wasteful, which requires periodic cleaning operations for removal and which will cause defects in castings if fragments of such deposits get into pourings. The mixer-chamber relationships are designed to avoid these problems. FIGURE 9 represents prior practice and shows a quantity of slip 90 being mixed with a mixer 92 inserted from above and including motor 94, shaft 96, and blade 98. It will be noted that a vortex cavity 100 is formed particularly if shaft 96 is not vertical which will commonly be the case with a "hung" mixer, which is usually removably clamped to the edge of a barrel or other container). The vortex cavity 100 demonstrates a situation causing air entrainment in the slip that usually will occur in the prior FIGURE 9 conventional methods. FIGURE 10 illustrates the situation with the present invention in which the axis of rotation of mixer 70 is disposed in a fixed, upstanding, vertical position. It will be noted that a vortex cavity is avoided, there being only some small depression at 102 in the surface of slip 60. Mixing, thus, leads to minimum air entrainment.

The disposition of mixer 70 upstanding from the center of the chamber helps in avoiding unmixed or unstirred slip. Another feature insuring thorough mixing and stirring is the upward flare of chamber side and end walls 64, 66, or, really the downward convergence of these walls tending to "funnel" slip to the mixture. It should be understood that slip used in casting ceramics has different characteristics than a plaster and will have relatively small tendency to set-up to a solid except in the presence of air and in the presence of a medium such as a porous mold to absorb water therefrom. However, this longer "pot life" is only relative and unmixed or unstirred slip will eventually set-up or substantially solidify. I have found corner areas to be a particular problem but have found that if generously radiused fillets 110 are used between bottom wall 72 and side and end walls 64, 66, deposits of unmixed and unstirred slip can be substantially avoided in the orientation of the equipment shown with the upstanding mixer and sloping walls. For purposes of definiteness "generously radiused fillets" are defined as having a minimum one inch radius, which is about the minimum to prevent ready formation of corner deposits. In practice at least a two inch radius is preferable to substantially prevent formation of deposits. This doesn't means that the fillets have to be true arcs of circles as they can be faired in any suitable curve, but the above limits will readily relate to the segments making up of even a nongeometrical curve, i.e., one faired by hand, which is to say that model of a circle with a one inch or two inch radius can be abutted to any curved segment, to see which has the larger equivalent radius.

Slip is withdrawn from chamber 62 through outlet opening 120 in bottom wall 72 which is covered by a dome shaped screen 122 to screen out any sizable unmixed slip particles. Outlet opening 120 connects to a centrifugal pump 124 which in turn connects to a flexible hose 126 which is of a length to fill molds, as 128, 130, 132, supported on rack 134 on the top of housing 10. Pump 124 is of a common centrifugal type with sufficient clearance of vanes to pump housing so that slip will by-pass when discharge is blocked. Other rotary pump with by-pass could be substituted but the centrifugal pump has worked out very well. By "by-pass" or clearance between vane ends and pump housing is meant that pump 124 and its electric motor are not overloaded when hose 126 is not being discharged and the pump may be run continously during a time when molds are being filled. Incidentally, mixer 70 and pump 124 are separately powered and controlled because it is desirable not to run mixer 70 during operation of pump 124 as a certain amount of air may be entrained in the slip during operation of mixer 70 although this is minimized with my equipment. Air will tend to bubble out of the slip if time is allowed between operations of the mixer and the pump.

Discharge from hose 126 is controlled by a nozzle 140 which has a trigger 142 controlling its valve 144. Nozzle 140 may be of the common type used in handling gasoline (not the more complex automatic shut-off type now commonly used in gasoline stations). When nozzle 140 has its valve closed and pump 124 continues operation, of course the by-pass aspect of pump 124 is then operative. Hose 126 may be of common rubber or rubber like construction used in gasoline handling or the like and slip will not have much tendency to solidify therein as air is substantially excluded and the rubber or plastic hose liner will be substantially non-porous. However, periodic flushing out with water is advisable, i.e., once in 60–90 days.

Rack 134 is preferably formed in three sections 150, 152, 154, for convenience in handling. Aluminum is a suitable material from which to fabricate the rack as slip does not appear to have much if any chemical reaction with slip. As noted above, iron should be avoided as the chemical reaction is pronounced. Rack 134 fits into a seat on the upper surface of the housing formed by flat horizontal inner portions 151 and by higher exterior portions 153.

Each section of rack 134 has side rails 156 and have a series of parallel, spaced apart rollers 158 forming transverse rails. As particularly shown in FIGURE 7, rails 156 have openings 160 receiving reduced diameter ends 162 of rollers 158. Only end rollers 158 are secured and this is accomplished by threaded ends 164, nuts 166 thereon, and washers 168 to abut against the inner wall of counterbores 170 in side rails 156.

The anti-frictional directional characteristics of rollers 158 are valuable in handling molds on racks 134. By "directional" is meant that rolling is lengthwise of the housing and not transversely. As above indicated molds can be heavy, and are even heavier when filled with slip. Even smaller molds are burdensome to lift particularly if a lot are involved in a day. The rollers permit pouring off molds without lifting. The common methods of handling slip and molds have been covered above, and it will be understood that filling molds through hose 126 saves labor and time relative to filling a pail from a barrel and pouring molds from the pail and pouring unused slip from the pail back into the barrel.

The rollers are pertinent to the prior function of pouring off molds by lifting them over the pail and pouring excess off and back into the pail. It will be understood that in ceramic casting, the molds are porous. When slip is poured therein, filling the mold, after a period of time the slip in contact with porous mold surfaces will have lost water and will have tended to set. As this time, the slip still in liquid condition can be poured out. The slip remaining in the mold, after setting a sufficient time, becomes "green ware" and will hold its form sufficiently for mold removal and for baking (and any glazing while green) if carefully handled. Rollers 158 are used to permit pouring off excess slip, back directly into chamber 62 or via sloping floors 68, without lifting, through the sequence shown in FIGURE 8. Mold 128 is illustrated with portion broken away to show the access opening 176 through which the slip is being deposited from nozzle 140 until the mold is filled. Molds 130 and 132 illustrates that after the mold has set a while, slip is poured off by tipping through a succession of positions until substantially up-ended, and then a mold may be tipped back to its original position, all with the principal weight of the molds being accepted by the rollers 158.

Slip exposed to the air will tend in time to solidify in nozzle 140 and this is avoided by providing secured to a side of the housing a tank 180 containing water 182 in which the nozzle is emersed when not in use, the water substantially preventing solidification.

A few features have yet to be covered. An electrical conductor 190 to motors 30, 32, is coiled on and supported by clips 192 on a housing end wall when not in use. Motors 30, 32, have pulleys 200, 202, connecting the same to pulleys 204, 206, connected to mixer shaft 74 and pump 124 through the means of V-belts 208, 210. Belt tightening is accomplished by a pair of plate like members 212, 214, of wood or other material, connected together at one side by hinges 216 and biased apart by screw 218 in one plate 212 and bearing on the other plate 214, thereby tightening belts 208, 210 as needed. The motors 30, 32, are mounted to one plate or base and the other plate is secured to transverse framing member 44.

Separate electrical switches 220, 222, are provided for mixer 70 and pump 124 respectively. An outlet opening 230 is provided in chamber bottom wall 72 and connects to a tube 232 which drains to one side of the housing and a rubber-like plug 234 normally is used to close outlet opening 230. This outlet is useful, for example, if screen 122 to pump opening 120 were to become clogged and it were desirable to drain the slip to get access to clean the screen.

It will be understood from the foregoing how a useful improvement has been made in the art of producing ceramic castings and the operation thereof, and how the objectives of the invention have been met and the advantages thereof. I do not wish to be understood as limiting myself to the precise details of construction of the specific embodiment of my invention shown and described. Instead, I wish to cover those modifications thereof which will occur to those skilled in the art after learning of my invention and which properly fall within the scope of my invention.

I claim:

1. Apparatus used in producing ceramic castings by depositing slip in molds, comprising:
   (a) a housing having interior walls forming an upwardly open chamber containing said slip including a bottom wall, and walls means upstanding from the bottom wall therearound and having generously radiused fillets between said bottom wall and said upstanding wall means to avoid build up of unmixed or unstirred slip
   (b) a powered mixer upstanding into said chamber from the central portion of said bottom wall whereby said slip may be originally mixed in said chamber and whereby said slip may be stirred to decrease viscosity before pouring
   (c) a powered pump connected to the lower portion of said chamber and effective to pump said slip from said chamber and a hose connecting to said pump and having a length to reach above the top of said housing for depositing said slip in molds
   (d) said interior walls extending in at least one horizontal direction from the top of said chamber forming a sloping floor making no more than a 45° angle with the horizontal and rack means supported at the top of said housing above said chamber and sloping floor whereby molds may be supported on said rack means to receive said slip from said hose, excess slip poured from said mold or coming directly from said hose falling into said chamber or falling onto said sloping floor which drains into said chamber.

2. The subject matter of claim 1 in which said upstanding wall means upwardly flare between said bottom wall and the level of said sloping floor thereby to assist in feeding said slip to said mixer without entraining air and without deposits of unmixed or unstirred slip.

3. The subject matter of claim 1 in which said housing is horizontally elongated and said chamber is midway between the ends of said housing, and said sloping floor has two sections each extending from said chamber to an end of said housing, said housing having exterior side and end walls separate from said interior walls, said exterior and interior walls being formed from a reinforced plastic with surfaces to which said slip substantially does not adhere.

4. The subject matter of claim 3 in which the upper edge of said housing has a seat defined by flat horizontal inner portions and higher exterior portions and said rack means having side rails resting on said flat inner portions of said seat and fitting between said higher exterior portions whereby said rack means is restrained against horizontal movement, said rack means having a series of parallel, spaced apart, transverse, rotatable rod shaped members extending between and rotatably supported by said side rails, whereby molds may be supported flat on said rack means and are directionally, anti-frictionally supported by said rotatable members when the molds are tipped to drain off excess slip after they are filled, said rack means being divided on transverse lines into several sections for ease of handling.

5. The subject matter of claim 1 in which said rack means has a series of parallel, spaced apart, transverse, rotatable, rod shaped members and has a pair of side rails rotatably supporting said rod shaped members, whereby molds may be supported flat on said rack means and are directionally, anti-frictionally supported by said rotatable members when the molds are tipped to drain off excess slip after they are filled.

6. The subject matter of claim 5 in which said rod shaped members have ends of reduced diameters and said side rails having openings receiving said ends of reduced diameters of size to permit free rotation of said rod shaped members, said rod shaped members being otherwise unsecured except end rod shaped members having end washers cured thereto and said side rails having outer counterbores receiving said washers thereby to retain said side rails in support of said rod shaped members.

7. The subject matter of claim 1 in which said hose has a nozzle on the end thereof and said housing having a water tank supported thereon receiving said nozzle whereby when not in use solidification of said slip in said nozzle prevented by emersion in water and whereby air access to said nozzle and hose is avoided.

8. The subject matter of claim 1 in which each corner of said housing has a supporting caster wheel whereby said housing may be moved from location to location, there being a drain line from the bottom of said chamber to the side of said housing and a removable plug in the inlet end of said line, said pump means being of centrifugal type permitting slip by-pass for continued operation when said hose is not discharging, said pump means connecting to the bottom of said chamber and there being a dome shaped screen covering the inlet to said pump means, said mixer having a shaft and a blade thereon, said hose having a nozzle at the end thereof with a trigger operated shut off valve.

9. The subject matter of claim 1 in which there is a first electric motor for powering said mixer and a second electric motor for powering said pump, said pump and said mixer each having a driven shaft with a pulley thereon and each motor having a pulley and a pair of belts connecting the pulley of said first motor to the pulley of said mixer and connecting the pulley of said second motor to the pulley of said pump, each motor having a mounting including a plate fixed relative to said housing and a motor base hingedly connected to said plate at one side and screw means between said plate and said base threadedly engaged in one and bearing on the other at a point spaced from the hinged connection whereby said belts may be tightened by pivoting of the motor bases about the hinged connection to the plates under force of said screw means, an electric power line to each motor and a common electrical conduit to said housing feeding said lines, and a separate switch for each line whereby said mixer and said pump may be separately operated.

10. The subject matter of claim 9 in which said housing is horizontally elongated and said chamber is midway between the ends of said housing, and said sloping floor has two sections each extending from said chamber to an end of said housing, said housing having substantially vertical side walls, said housing having an outline in side view generally in the form of a T with an upper broader portion including upright top end walls at the outer ends of said sloping floors, with a reduced width vertically intermediate portion including upwardly flaring intermediate end walls, including a base broader portion including upright base end walls, and including sloping walls joining said base end walls to said intermediate end walls and including sloping walls joining said top end walls to said intermediate end walls, a motor at one end of said base portion connected to said pump and a motor at the other end of said base portion connected to said mixer, access openings to said motors in said sloping walls joining said base end walls to said intermediate end walls, said motors protruding into said access openings, and concave covers over said access openings and the portions of said motors protruding into said access openings.

11. Apparatus used in producing ceramic castings by depositing slip in molds, comprising:

(a) a housing having interior walls forming an upwardly open chamber containing said slip including a bottom wall, and walls means upstanding from the bottom wall therearound and having generously radiused fillets between said bottom wall and said upstanding wall means to avoid build up of unmixed or unstirred slip (b) a powered mixer upstanding into said chamber from the central portion of said bottom wall whereby slip may be originally mixed in said chamber and whereby slip may be stirred to decrease viscosity before pouring (c) a powered pump connected to the lower portion of said chamber and effective to pump said slip from said chamber and a hose connecting to said pump and having a length to reach above the top of said housing for depositing said slip in molds.

12. The subject matter of claim 11 in which said mixer has an upstanding shaft into said chamber and blade means thereon and in which said upstanding wall means upwardly flare from said bottom will thereby to assist in feeding slip to said mixer without entraining air and without deposits of unmixed or unstirred slip.

13. Apparatus used in producing ceramic castings by depositing slip in molds, comprising:

(a) housing means forming a receptacle containing said slip (b) a pump connected to said housing to withdraw said slip therefrom (c) a flexible hose connected at one end to said pump and a nozzle attached to the other end of said hose for filling molds (d) a tank and water in said tank, said tank being positioned so said nozzle can reach the same, and said nozzle being positioned therein to avoid solidification of said slip in said nozzle when not in use.

14. Apparatus used in producing ceramic castings by depositing slip in molds, comprising:

(a) means forming a receptacle containing said slip (b) rack means for supporting said molds positioned above said receptacle so that material falling from said molds will be received in said receptacle (c) said rack means having a series of rotatable spaced apart, parallel, rod shaped members which are rotatably supported, molds supported on said rack means, whereby said molds may be positioned flat on said rollers when being poured and whereby said molds may be directionally, anti-frictionally supported by said rollers as they are tipped to pour off excess slip and means for removing slip from said receptacle for filling said molds.

References Cited

UNITED STATES PATENTS

| | | | |
|---|---|---|---|
| 1,260,636 | 3/1918 | Campbell et al. | 141—86 X |
| 2,702,684 | 2/1955 | MacLeod et al. | 222—109 X |

SAMUEL F. COLEMAN, Primary Examiner

H. S. LANE, Assistant Examiner

U.S. Cl. X.R.

141—90, 124, 389, 391; 222—109, 148, 530